Aug. 6, 1940.  C. E. CARPENTER  2,210,278

DOUGH BATCH CUTTER AND THE LIKE

Filed April 19, 1938

Inventor:
Charles E. Carpenter,

Patented Aug. 6, 1940

2,210,278

UNITED STATES PATENT OFFICE 2,210,278

DOUGH BATCH CUTTER AND THE LIKE

Charles E. Carpenter, Chicago, Ill.

Application April 19, 1938, Serial No. 202,844

10 Claims. (Cl. 107—14)

This invention relates to improvements in dough batch cutters and the like, especially that type intended for the cutting of doughnut batches. The structures herein disclosed are of very simple form, and may be built at low cost; and are so designed that they are rugged and durable in form. These doughnut cutters are of that type in which the dough batch is positively forced out and delivered from a cylinder or the like, and in which, also, the quantity of dough delivered at each operation may be adjusted so that larger or smaller doughnuts will be formed as desired. In certain features the devices of the present invention are similar to that disclosed in Letters Patent of the United States, No. 2,024,428, issued to me for Improvements in doughnut machines, December 17, 1935. In that patent there is disclosed a structure in which a cylinder member is vertically reciprocated to induct and also to deliver the dough batch, said cylinder having a suitable valve in its top to permit the ingress of the dough, and to prevent the back-flow of the dough therefrom. Said cylinder moves vertically, telescoping within another cylinder member, and the upper portion of said cylinder is adapted to ride up and down in the lower end portion of the dough hopper.

In the present application I have disclosed arrangements in which the cylinder proper, as such, remains stationary, and the vertical movements are performed by the valve and valve seat which control the entering and back-flow preventing movements of the dough; and generally these parts remain below the lower end of the dough hopper. By this arrangement the tendency of the moving parts to "knead" the dough is reduced, since the dough moving down from the hopper travels directly into and through the inlet valve, and through the cylinder member, and none of these parts enter directly into the hopper proper.

The movable cylinder head and inlet valve therein, serve to control and cause the inflow of the dough from the hopper; and I provide the usual cut-off sleeve and die in conjunction therewith and at the lower end of the delivery throat. Sometimes I also provide an intermediate vertically movable cylinder head, having a delivery valve therein, and located between the upper cylinder head and the sleeve aforesaid. In such case the upper movable cylinder head serves to induct the dough from the hopper, and the lower movable cylinder head serves to deliver the dough to the cut-off sleeve and die. All these parts are properly timed and driven to perform their functions. In other cases, I omit the intermediate movable cylinder head and its valve, and deliver the dough directly to the sleeve and cut-off die.

It is noted that the induction of the dough from the hopper is due to the formation of a vacuum of greater or less perfection below the inlet valve, so that the dough will be thereby caused to flow from the hopper through said valve and into the space below the upper movable cylinder head. In some cases I am able to so arrange the parts that during the first portion of the upward movement of the cylinder head and inlet valve said valve will remain closed, and a considerable vacuum will be developed below the valve, so that at a further time and further movement of said parts the valve port will open and the dough will move into the space beneath the movable cylinder head very rapidly, and will remain in its so moved position, without the need of providing any form of check valve to prevent any back flow of the dough towards the hopper.

A further feature of the present invention is to provide arrangements such that adjustments may be made from time to time to vary the amount of the dough batch which will be delivered; and in this connection to provide arrangements such that a very definite and positive control of the amount of dough delivered will be ensured. Also, to so arrange the parts that the amount of piston movement may be varied for the above purposes, and also to provide for variation of the limits of piston movements in either direction, or in both directions, as desired.

Other objects and uses of the invention will appear from a detailed description of the same, which consists in the features of construction, and combinations of parts hereinafter described and claimed.

In the drawing:

Figure 1 shows a vertical section through a typical construction embodying the features of my present invention, the form therein shown including both an inlet valve and a delivery valve, together with upper and lower movable cylinder heads, and the usual cut-off sleeve and die, the parts being shown in Figure 1 just after the conclusion of the delivery stroke, and the closing of the cut-off sleeve, and just before the beginning of the induction stroke;

Figure 1:
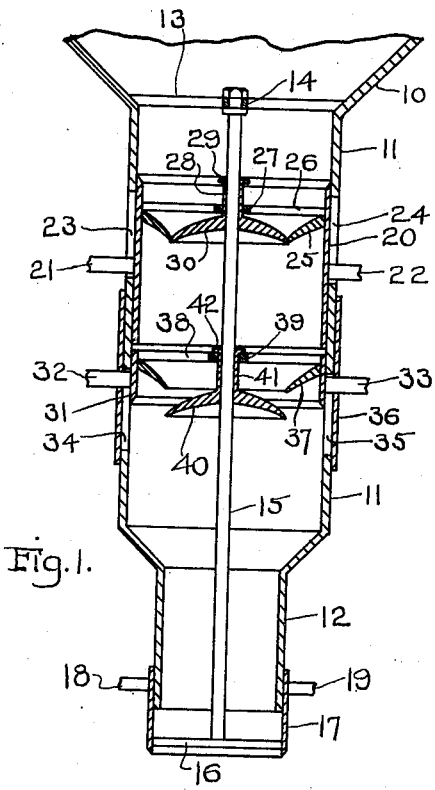

Referring first to the arrangement of Figure 1, I have therein shown the lower portion of a hopper for the dough at the position 10. Downwardly extending therefrom there is a cylindrical extension 11, which terminates in the contracted throat portion 12. Extending across the hopper (preferably in its lower portion) is the spider or bracket 13, having a number of separated arms between which the dough may move downwardly, and which arms carry the central hub portion 14, from which the rod 15 extends down to the lower end of the throat. The cut-off die 16 is carried by the lower end of this rod. A cut-off sleeve 17 works on the outside of the throat, and moves up and down to co-operate with the die 16. When said sleeve is lowered it seals against the die cutting off the dough batch, and at the same time closing the annular opening around the lower end of the throat in tight manner. Said sleeve 17 has the pins 18 and 19 by means of which it can be moved up and down as presently explained.

Within the cylinder 11 there is slidingly mounted the sleeve 20. Said sleeve has the pins 21 and 22 which extend out through the slots 23 and 24 of the cylinder so that the sleeve can be reciprocated from without the cylinder; and said slots are at all times overlaid and closed by the sleeve during the full travels of the sleeve in both directions. Thus the dough within the cylinder is prevented from working out through said slots. There is a valve seat member 25 carried by the sleeve 20. Said member 25 therefore moves up and down with the sleeve. Said member 25 also carries the spider member 26, having a series of separated arms which carry the hub portion 27; and a short neck 28 is reciprocatingly extended through said hub portion. Said neck has the top enlargement 29 which will come against the hub 27 to limit the downward movement of the neck in comparison to the position of the hub (and therefore also the position of the member 25), so that no matter what the vertical position of the member 25 the neck cannot move below a certain position in comparison thereto. The neck 28 carries the valve disk 30 at its lower end, which valve is of proper size to seat against the port of the member 25 when the neck and valve are fully raised thereagainst; and the valve may move down sufficiently to fully open the port for induction of dough, but may never fall too low due to the limitation of the enlargement 29.

Within the cylinder 11 below the sleeve 20 there is another short sleeve or collar 31, which has the pins 32 and 33 extending out through the slots 34 and 35 of the cylinder, so that said pins may be used to reciprocate the collar 31 up and down; and there is a sleeve 36 working on the outside of the cylinder 11, and travelling up and down with the pins 32 and 33, said sleeve serving to keep the slots closed at all times for the full travels of the pins. There is another valve seat member 37 carried by the collar 31, and travelling up and down therewith; and the same carries another spider 38, having separated arms carrying the central hub 39; and the valve member 40 is carried by the neck 41, having the enlargement 42 adapted to seat against the hub 39 to limit the downward movement of the valve 40 with respect to the member 37.

It is here noted that the vertical reciprocations of the sleeves 20 and 31 may be such that in each case the valve (30 or 40 as the case may be) will close early in the downward movement of the sleeve (20 or 31 as the case may be), so that thereafter the further reciprocation of such sleeve will serve to move the dough beneath the member (25 or 37 as the case may be), and thus ensure delivery of the dough in a downward direction. It is also noted that the amount of the dough which will be so delivered will depend on the extent of the reciprocation accomplished as above explained. By increase or decrease of such reciprocation the size of the dough batch delivered may be adjusted.

Figure 4:
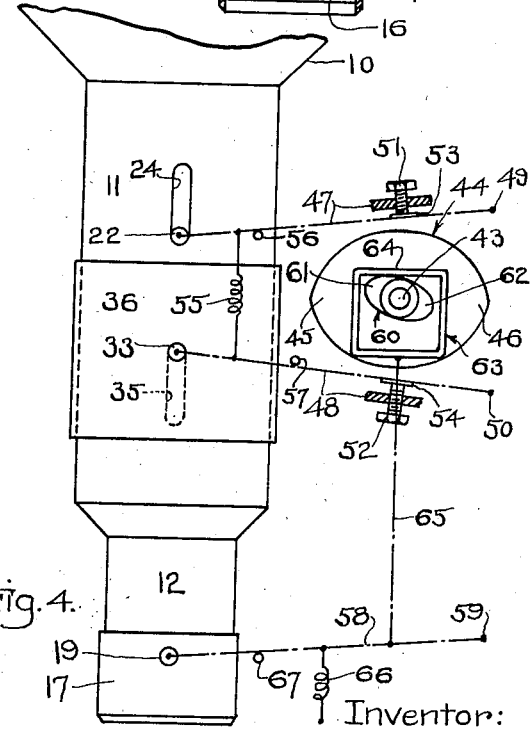
Figure 4 shows an outside view at right angles to the views of Figures 1, 2 and 3, and shows a simple form of operating connections for operating the parts of a structure such as that of Figure 1 in particular.

The sleeves 20, 31 (and 36) and 17, and the pins 21—22, 32—33 and 18—19, may be reciprocated in proper timing and degree in any suitable manner. Reference to Figure 4 will show a simple form of device for securing such movements. In this case there is provided a drive shaft 43, having thereon the double cam 44 having the enlargements or lobes 45 and 46 of like form. The arms 47 and 48 are pivoted at the points 49 and 50, and said arms may, if desired, be bifurcated so as to engage both of the pins of a pair and thus ensure an even transmittal of force to the sleeve being driven. In Figure 4 only the pins 22, 33 and 19 are shown, as Figure 4 is a view looking towards the right of Figure 1, but it will be understood that when bifurcated arms are used the other bifurcations thereof will engage with the pins 21, 32 and 18, respectively. Each of the arms 47 and 48 carries a screw adjustment such as 51 and 52, having the shoes 53 and 54 at their lower ends, which shoes engage with the cam lobes so that thereby the arms are thereby reciprocated. It is to be noted that by this arrangement the extent of arm movement will be variable, since there may be established a certain amount of dwell proportioned to the clearance established by the screw adjustments. A spring 55 joins the arms 47 and 48 together so as to return them to initial positions determined by the stop pins 56 and 57, or by the extremities of the slots in which the pins travel.

There is an arm 58 pivoted at the point 59. This arm connects with one or both of the pins 18 and/or 19, to operate the cut-off sleeve, such arm 58 being bifurcated if need be. There is a double cam 60 on the shaft 43, having the lobes 61 and 62; and a yoke 63 is so placed that its top face 64 may be engaged by these lobes in succession so as to raise and lower the yoke. A link 65 connects the yoke with the arm 58 so as to raise the cut-off sleeve, and a spring 66 is provided for lowering said arm against the stop 67.

With the arrangements so far described the operations may be as follows: The parts are so timed that during each half revolution of the shaft 43 a dough batch is delivered and cut off, there being therefore two complete operations for each revolution of the shaft. The parts are so timed that from the position shown in Figure 1 the sleeve 17 will commence to rise so as to effect an opening of the annular dough passage above the die 16 and below the lower edge of the throat. When such opening has been effected, the member 37 will commence to lower and the member 25 will commence to rise, so that soon the valve 40 will close and force down a quantity of dough towards the delivery opening, such dough pressing the dough below it to and through the delivery opening; and at the same time the member 25, together with the valve 30 will rise, the member 25 rising alone until the valve has completely opened the port, whereafter, due to the enlargement 29 the valve 30 will be carried up with said member, and a new charge or batch of dough will be transmitted through said port to the space beneath the member 25. In other words, the members 25 and 37 move in opposite directions simultaneously.

When the dough delivering operation as thus explained has been completed, and a fresh batch of dough has been drawn into the space between the members 25 and 37, the sleeve 17 will be lowered to cut off the dough batch thus delivered, into the form of a doughnut; thereby also sealing the annular opening between the die 16 and the lower end of the throat. Thereafter the members 25 and 37 will move towards each other, and during the first portion of such movement the valve 30 will seat against the member 25 to close the port thereof, and the member 37 will draw away from the valve 40 until limited by the enlargement 42, after which the dough between the members 25 and 37 (or a portion thereof) will be transmitted to the space beneath the member 37, and the dough beneath the member 25 will be forced downwards. It thus appears that the separating moves are accompanied by delivery of the dough batch from the cutter, and simultaneous entry of fresh dough into the space between the members 25 and 37; and that the moves of the members 25 and 37 towards each other are accompanied by transmittal of dough from the space between said members to the space beneath the member 37 and above the delivery position. It is also to be noted that in each case the valve movements are accomplished by the pressure of the dough beneath the valve, resisting the movement of the valve, and that the movements of the members 25 and 37 are sufficient to not only accomplish such valve movements, but also to accomplish the actual transfer of the desired volume of the dough itself after the valve has closed.

Figure 2:
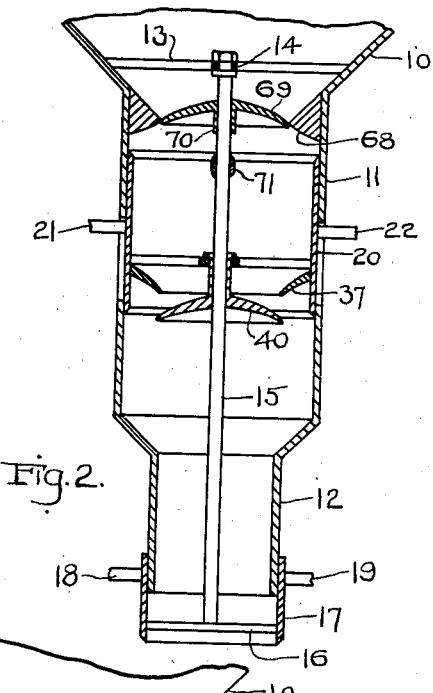
Figure 2 shows a view similar to that of Figure 1, but in which arrangement the upper cylinder head is stationary, and is provided with an inlet valve, the parts being in position similar to that of Figure 1.

In the modified arrangement shown in Figure 2 I have dispensed with the member 25 and its valve 30, but have substituted a stationary member 68 having a large central port; and have also provided the valve 69 having the neck 70 sliding on the rod 15; and I have provided a stop 71 on the rod 15 to limit the downward movement of such neck and the valve 69 during the opening movements. With this arrangement it will be seen that when the member 37 is lowered by the sleeve 20 and pins 21 and 22, the valve 40 will close and force down the dough beneath the member 37, and at the same time fresh dough will be drawn in through the port of the member 68 into the space beneath said member and above the member 37. On the return movement the valve 69 will close and dough will be transferred from the space above the member 37 to the space beneath said member. It will be understood that with this arrangement the driving mechanisms may be similar to those shown in Figure 4, but the arm 47 and connected parts may be eliminated, since the member 68 does not move. This arrangement of Figure 2 presents the advantage of simplicity of construction and operation, since the number of moving parts has been reduced.

Figure 3:
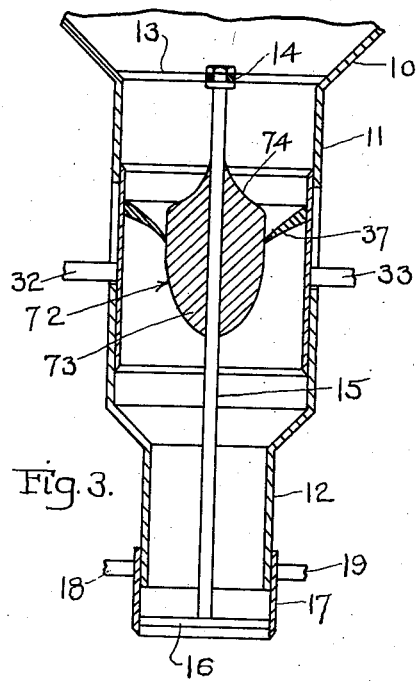
Figure 3 shows an arrangement embodying a movable upper cylinder head together with a stationary valve therefor, the parts being shown in position similar to those of Figures 1 and 2.

In the modified arrangement of Figure 3 the member 37 is retained, the member 25 and valve 30 having been eliminated; and in place of the valve 40 for the member 37 I have provided the valve member 72 which is mounted stationary on the rod 15. The said valve member 72 is of proper size to just close the port of the member 37 when said member is brought down low enough for that purpose; and the lower end portion 73 of this valve member is preferably streamlined as shown, and the upper end portion of said valve member 74 is preferably curved inwardly on a sharp angle as shown. With this arrangement, as the member 37 rises from the position shown in Figure 3, the space beneath said member 37 enlarges so that a considerable vacuum is developed beneath said member, it being understood that the cut-off sleeve is in closed position during such rising movement. This vacuum will increase as the member 37 rises until finally the contracted portion of the valve member 72 is encountered, whereupon there will be a sudden opening of considerable amount produced, so that a fresh batch of dough will rush into the vacated space beneath the member 37 to fill such space. Thereafter, when the member 37 is again lowered, it being understood that the cut-off sleeve has been raised to open the annular opening, the annular opening around the valve member 74 will be closed by the member 37, and further downward movement of said member 37 will serve to force the dough downwardly and a dough batch will be delivered out at the delivery opening preparatory to being cut off when the cut-off sleeve afterwards comes down. It will be understood that with the arrangement of Figure 3 the member 37 should never move low enough to bring its port to the contracted lower portion 73 of the valve member 72, it being understood that the body portion of said valve member is of uniform cylindrical size as shown in the figure.

It will be noted that in the arrangement which is shown in Figure 3, the adjustment of the screw 52 (which adjusts the downward movement of the member 37) will provide for a greater or less extent of such downward movement, and since this lower extremity of such movement occurs while the member 37 is in engagement with the cylindrical portion of the valve member 72, it follows that the extent of vacuum or vacuum space developed during the upward movement of such member will be adjusted, so that the amount of dough which will thereafter rush in will be accordingly enlarged or lessened. For example, if the adjustment is changed so as to cause a greater degree of lowering movement to occur, a greater amount of dough will be expelled from beneath the member 37, due to the greater amount of such lowering; and thereafter when the member 37 is raised it will have to rise to a greater extent before the port thereof will come to the contracted upper portion 74 of the valve member 72, so that when the opening does occur a greater amount of dough will rush in to fill the void thus evacuated. Thus it happens that this arrangement will produce an adjustment of the amount of dough which will be delivered.

While I have herein shown and described only certain embodiments of the features of my present invention, still I do not intend to limit myself thereto, except as I may do so in the claims to follow.

I claim:

1. In a dough batch cutter, the combination with a delivery throat and cut-off die and sleeve therefor, and a cylinder above said throat, of a pair of ported members operatively mounted within said cylinder, valves for the ports thereof, and means to reciprocate said members towards and away from each other alternately and in time with the sleeve movements, whereby when said members are moved towards each other dough between them is transferred from the space between them to the space beneath the lowermost of said members and to the position of the cut-off sleeve, substantially as described.

2. In a dough batch cutter, the combination with a delivery throat and cut-off die and sleeve therefor, and a cylinder above said throat, of a pair of ported members operatively mounted within said cylinder, valves for the ports thereof, and means to move said members on one portion of a cycle to decrease the space between them, and on another portion of said cycle to increase the space between them, together with means to move the cut-off sleeve in proper timing with such movements to thereby cut off dough batches delivered at the position of the said sleeve, substantially as described.

3. In a dough batch cutter, the combination with a hopper for dough, of a cylinder extending downwardly therefrom, a delivery throat at the lower end of said cylinder, a cut-off die and sleeve in conjunction with said throat, a pair of ported members mounted within the cylinder for reciprocation therein, valves for the ports of said members, together with means to reciprocate said members towards and from each other in proper timing and to operate the cut-off sleeve in proper timing with respect to said parts, substantially as described.

4. In a dough batch cutter, the combination of a hopper for dough, a cylinder extending downwardly therefrom, a delivery throat at the lower end of said cylinder, a cut-off die and sleeve in conjunction with said throat, a ported member vertically movable within the cylinder, a valve for the port thereof, a stationary ported member above said vertically movable ported member, a valve for the port of such stationary ported member, together with means to reciprocate the vertically movable ported member and the cut-off sleeve in proper timing with respect to each other, substantially as described.

5. In a dough batch cutter, the combination with a hopper for dough, of a cylinder extending downwardly therefrom, a delivery throat at the lower end of said cylinder, a cut-off die and sleeve in conjunction with said throat, a vertically movable ported member with the cylinder, a valve for the port thereof, a stationary ported member above said vertically movable ported member, a valve for the port thereof, together with means to reciprocate the vertically movable ported member and the cut-off sleeve in timed relationship, and means to vary the degree of reciprocation of the vertically movable ported member to thereby vary the size of dough batches delivered, substantially as described.

6. In a dough batch cutter, the combination with a hopper for dough, of a cylinder extending downwardly therefrom, a cut-off die and sleeve in conjunction with said throat, a pair of ported members vertically movable within the cylinder, valve members therefor, together with means to reciprocate said ported members towards and from each other, and to reciprocate the cut-off sleeve, all in proper timing with respect to each other, and means to vary the extent of reciprocation of the ported members, to thereby vary the size of dough batches delivered, substantially as described.

7. In a dough batch cutter, the combination with a hopper for dough, of a cylinder extending downwardly therefrom, a cut-off die and sleeve in conjunction with said throat, a ported member vertically movable within the cylinder, a valve member therefor, a stationary ported member above the vertically movable ported member, a valve member for said stationary ported member, together with means to reciprocate the ported member and the cut-off sleeve in proper timing with respect to each other, and means to vary the degree of reciprocation of the ported member, to thereby vary the size of dough batches cut-off and delivered, substantially as described.

8. In a dough batch cutter, the combination of a hopper for dough, a cylinder extending downwardly therefrom, a delivery throat at the lower end of said cylinder, a cut-off die and sleeve in conjunction with said throat, a ported member vertically movable within the cylinder, a valve for the port thereof, another ported member above said first mentioned ported member, a valve for the port of said other ported member, together with means to reciprocate the first mentioned ported member and the cut-off sleeve in proper timing with respect to each other, substantially as described.

9. In a dough batch cutter, the combination with a hopper for dough, of a cylinder extending downwardly therefrom, a delivery throat at the lower end of said cylinder, a cut-off die and sleeve in conjunction with said throat, a vertically movable ported member within the cylinder, a valve for the port thereof, another ported member above said vertically movable ported member, a valve for the port of said other ported member, together with means to reciprocate the vertically movable ported member and the cut-off sleeve in timed relationship, and means to vary the degree of reciprocation of the vertically movable ported member to thereby vary the size of dough batches delivered, substantially as described.

10. In a dough batch cutter, the combination with a hopper for dough, of a cylinder extending downwardly therefrom, a delivery throat at the lower end of said cylinder, a cut-off die and sleeve in conjunction with said throat, a vertically movable ported member within the cylinder, a valve for the port thereof, another ported member also within the cylinder, a valve for the port of said other ported member, together with means to reciprocate the first mentioned ported member and the cut-off die and sleeve in proper timing with respect to each other, substantially as described.

CHARLES E. CARPENTER.